United States Patent
Vasiliev et al.

(10) Patent No.: US 10,698,285 B2
(45) Date of Patent: *Jun. 30, 2020

(54) ELECTROCHROMIC DEVICE AND METHOD FOR MANUFACTURING ELECTROCHROMIC DEVICE

(71) Applicant: iGlass Technology, Inc., Irvine, CA (US)

(72) Inventors: Evgeniy Vladimirovich Vasiliev, Novosibirsk (RU); Sergey Olegovich Borisov, Novosibirsk (RU); Pavel Anatolievich Zaikin, Novosibirsk (RU); Nikita Valerievich Kruglikov, Novosibirsk (RU)

(73) Assignee: IGLASS TECHNOLOGY, INC., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,731

(22) Filed: Jun. 10, 2019

(65) Prior Publication Data

US 2019/0292445 A1 Sep. 26, 2019

Related U.S. Application Data

(63) Continuation of application No. 14/300,220, filed on Jun. 9, 2014, now Pat. No. 10,344,208.

(51) Int. Cl.
*G02F 1/15* (2019.01)
*B29D 11/00* (2006.01)
*G02F 1/1516* (2019.01)

(52) U.S. Cl.
CPC .......... *G02F 1/15* (2013.01); *B29D 11/00634* (2013.01); *G02F 1/15165* (2019.01)

(58) Field of Classification Search
CPC .. G02F 1/161; G02F 1/155; G02F 2001/1512; G02F 2001/1515; G02F 1/15;
(Continued)

(56) References Cited

U.S. PATENT DOCUMENTS 5,774,255 A    6/1998   Howard
6,067,184 A    5/2000   Bonhote et al.
(Continued)

FOREIGN PATENT DOCUMENTS

CN    104698717 A    6/2015
CN    104865767 A    8/2015
(Continued)

OTHER PUBLICATIONS

US 9,891,496, Jun. 27, 2001, Thompson et al. (Withdrawn).
(Continued)

*Primary Examiner* — Wen Huang
(74) *Attorney, Agent, or Firm* — Morgan, Lewis & Bockius LLP

(57) ABSTRACT

The invention relates to devices that provide a color change under the influence of an electric voltage, in particular to an electrochromic device and a method for manufacturing such a device. Disclosed is the method for manufacturing an electrochromic device comprising at least two electrodes that are flexible and optically transparent with a hermetically closed space between the electrodes filled with an electrochromic composition that may contain transparent and insoluble microparticles that function as spacers.

12 Claims, 2 Drawing Sheets

(58) Field of Classification Search
CPC ......... B29D 11/00634; B29D 11/0074; B29D 99/0053; C09K 9/02; C09K 2211/1018; C09K 2211/14; C09K 2211/187
USPC .................. 359/266, 242, 265, 273; 252/583
See application file for complete search history.

(56) References Cited

U.S. PATENT DOCUMENTS

| | | |
|---|---|---|
| 6,509,999 B1 | 1/2003 | Shelepin et al. |
| 6,853,472 B2 | 2/2005 | Warner et al. |
| 7,106,489 B2 | 9/2006 | Berneth et al. |
| 7,256,925 B2 | 8/2007 | Noh et al. |
| 7,295,361 B2 | 11/2007 | Gavrilov et al. |
| 7,428,091 B2 | 9/2008 | Baumann et al. |
| 7,638,632 B2 | 12/2009 | French et al. |
| 7,667,043 B2 | 2/2010 | Getty et al. |
| 7,988,885 B2 | 8/2011 | Percec et al. |
| 8,323,534 B2 | 12/2012 | Percec et al. |
| 8,736,943 B2 | 5/2014 | Guarr et al. |
| 8,867,116 B1 | 10/2014 | Kloeppner et al. |
| 8,902,486 B1 | 12/2014 | Chandrasekhar |
| 8,947,758 B2 | 2/2015 | Agrawal et al. |
| 9,057,925 B2 | 6/2015 | Veenman et al. |
| 9,069,222 B2 | 6/2015 | Naijo et al. |
| 9,145,090 B2 | 9/2015 | Barksdale et al. |
| 9,159,890 B2 | 10/2015 | Moosburger et al. |
| 9,170,466 B2 | 10/2015 | Marcel et al. |
| 9,207,515 B2 | 12/2015 | Chandrasekhar |
| 9,304,368 B2 | 4/2016 | Yashiro et al. |
| 9,440,588 B2 | 9/2016 | Nelson et al. |
| 9,482,880 B1 | 11/2016 | Chandrasekhar et al. |
| 9,500,888 B2 | 11/2016 | Schwartz et al. |
| 9,500,926 B2 | 11/2016 | Fujimura et al. |
| 9,529,240 B2 | 12/2016 | Paolini et al. |
| 9,547,213 B2 | 1/2017 | Lee et al. |
| 9,738,140 B2 | 8/2017 | Ash et al. |
| 9,766,496 B2 | 9/2017 | Cammenga et al. |
| 9,778,534 B2 | 10/2017 | Tran et al. |
| 9,785,030 B2 | 10/2017 | Biver et al. |
| 9,807,847 B2 | 10/2017 | Wang et al. |
| 9,810,963 B2 | 11/2017 | Gauthier et al. |
| 9,823,796 B2 | 11/2017 | Wang |
| 9,829,762 B2 | 11/2017 | Takahashi et al. |
| 9,841,652 B2 | 12/2017 | Biver et al. |
| 9,857,656 B2 | 1/2018 | Seo et al. |
| 9,869,918 B2 | 1/2018 | Matsumoto et al. |
| 9,880,441 B1 | 1/2018 | Osterhout |
| 9,891,497 B2 | 2/2018 | Yashiro et al. |
| 9,933,680 B2 | 4/2018 | Taya et al. |
| 9,939,703 B1 | 4/2018 | Nguyen |
| 9,955,577 B2 | 4/2018 | Cho et al. |
| 10,344,208 B2 | 7/2019 | Vasiliev |
| 2002/0021481 A1 | 2/2002 | Lin et al. |
| 2003/0161025 A1 | 8/2003 | Asano |
| 2004/0257633 A1 | 12/2004 | Agrawal et al. |
| 2006/0050357 A1 | 3/2006 | Gavrilov et al. |
| 2009/0027757 A1 | 1/2009 | Kokeguchi |
| 2009/0279160 A1 | 11/2009 | Percec et al. |
| 2010/0018578 A1 | 1/2010 | Yu |
| 2010/0110523 A1 | 5/2010 | Varaprasad |
| 2011/0147680 A1 | 6/2011 | Percec et al. |
| 2011/0149366 A1 | 6/2011 | Percec et al. |
| 2011/0216389 A1 | 9/2011 | Piroux et al. |
| 2011/0222138 A1 | 9/2011 | Piroux et al. |
| 2011/0317243 A1 | 12/2011 | Piroux et al. |
| 2012/0139824 A1 | 6/2012 | Takahashi |
| 2012/0242614 A1 | 9/2012 | Ferreira et al. |
| 2013/0251943 A1 | 9/2013 | Pei |
| 2014/0198370 A1 | 7/2014 | Trajkovska-Broach et al. |
| 2015/0077832 A1 | 3/2015 | Berland et al. |
| 2015/0153624 A1 | 6/2015 | Yamada et al. |
| 2015/0160525 A1 | 6/2015 | Shi |
| 2015/0212382 A1 | 7/2015 | Miyazaki |
| 2015/0219974 A1 | 7/2015 | Trajkovska-Broach et al. |
| 2015/0227016 A1 | 7/2015 | Yamada et al. |
| 2015/0261009 A1 | 9/2015 | Boulton |
| 2015/0261056 A1 | 9/2015 | Kumar et al. |
| 2015/0286107 A1 | 10/2015 | Chen et al. |
| 2015/0322296 A1 | 11/2015 | Keite-Telgenbuscher et al. |
| 2015/0338714 A1 | 11/2015 | Li |
| 2015/0346573 A1 | 12/2015 | Theiste et al. |
| 2015/0378396 A1 | 12/2015 | Park et al. |
| 2016/0005375 A1 | 1/2016 | Naijo et al. |
| 2016/0011428 A1 | 1/2016 | Li et al. |
| 2016/0033836 A1 | 2/2016 | Chen |
| 2016/0033839 A1 | 2/2016 | Lee et al. |
| 2016/0033842 A1 | 2/2016 | Shi et al. |
| 2016/0041447 A1 | 2/2016 | Yamamoto et al. |
| 2016/0079560 A1 | 3/2016 | Guimard |
| 2016/0167339 A1 | 6/2016 | Dollase et al. |
| 2016/0167584 A1 | 6/2016 | Chan et al. |
| 2016/0170277 A1 | 6/2016 | Lu et al. |
| 2016/0203399 A1 | 7/2016 | Cox |
| 2016/0223877 A1 | 8/2016 | Magdassi et al. |
| 2016/0229803 A1 | 8/2016 | Lin et al. |
| 2016/0231635 A1 | 8/2016 | Aiken et al. |
| 2016/0243773 A1 | 8/2016 | Wang |
| 2016/0246152 A1 | 8/2016 | Igawa et al. |
| 2016/0259224 A1 | 9/2016 | Ozyilmaz et al. |
| 2016/0266461 A1 | 9/2016 | Yamamoto |
| 2016/0282978 A1 | 9/2016 | Wang |
| 2016/0299401 A1 | 10/2016 | Kubo et al. |
| 2016/0306251 A1 | 10/2016 | Yamamoto et al. |
| 2017/0003562 A1 | 1/2017 | Kubo et al. |
| 2017/0018370 A1 | 1/2017 | Segawa et al. |
| 2017/0031224 A1 | 2/2017 | Gil et al. |
| 2017/0031226 A1 | 2/2017 | Gauthier et al. |
| 2017/0059957 A1 | 2/2017 | Garcia et al. |
| 2017/0082864 A1 | 3/2017 | Zhao et al. |
| 2017/0100991 A1 | 4/2017 | Cammenga et al. |
| 2017/0108754 A1 | 4/2017 | Ali |
| 2017/0114274 A1 | 4/2017 | Yamada et al. |
| 2017/0117505 A1 | 4/2017 | Kwon |
| 2017/0131609 A1 | 5/2017 | Okada et al. |
| 2017/0146882 A1 | 5/2017 | Bass et al. |
| 2017/0158139 A1 | 6/2017 | Tonar et al. |
| 2017/0168363 A1 | 6/2017 | Kim et al. |
| 2017/0176833 A1 | 6/2017 | Goto et al. |
| 2017/0192334 A1 | 7/2017 | An et al. |
| 2017/0199383 A1 | 7/2017 | Machida |
| 2017/0219900 A1 | 8/2017 | Kim et al. |
| 2017/0229000 A1 | 8/2017 | Law |
| 2017/0235203 A1 | 8/2017 | Yamamoto et al. |
| 2017/0235204 A1 | 8/2017 | Bergh et al. |
| 2017/0239931 A1 | 8/2017 | Wolk et al. |
| 2017/0293193 A1 | 10/2017 | Miyazaki |
| 2017/0298682 A1 | 10/2017 | Wang et al. |
| 2017/0307952 A1 | 10/2017 | Ash et al. |
| 2017/0313934 A1 | 11/2017 | Yamada et al. |
| 2017/0315384 A1 | 11/2017 | Saylor et al. |
| 2017/0329196 A1 | 11/2017 | Timmerman et al. |
| 2017/0329197 A1 | 11/2017 | Yashiro et al. |
| 2017/0329199 A1 | 11/2017 | Yashiro et al. |
| 2017/0336692 A1 | 11/2017 | Park et al. |
| 2017/0349103 A1 | 12/2017 | Tonar et al. |
| 2017/0351126 A1 | 12/2017 | Chu et al. |
| 2017/0355313 A1 | 12/2017 | Park et al. |
| 2017/0355901 A1 | 12/2017 | Branda et al. |
| 2018/0004013 A1 | 1/2018 | Vasiliev et al. |
| 2018/0017835 A1 | 1/2018 | Kim et al. |
| 2018/0039148 A1 | 2/2018 | Franz et al. |
| 2018/0066132 A1 | 3/2018 | Nair et al. |
| 2018/0074377 A1 | 3/2018 | You et al. |
| 2018/0088426 A1 | 3/2018 | Posset et al. |
| 2018/0095338 A1 | 4/2018 | Ash et al. |
| 2018/0100056 A1 | 4/2018 | Wang et al. |
| 2018/0105738 A1 | 4/2018 | Giri |
| 2018/0112127 A1 | 4/2018 | Franz et al. |
| 2018/0113366 A1 | 4/2018 | Kaneko et al. |
| 2018/0121011 A1 | 5/2018 | Vasilyev et al. |

(56) References Cited

U.S. PATENT DOCUMENTS

FOREIGN PATENT DOCUMENTS

| | | |
|---|---|---|
| CN | 106997134 A | 8/2017 |
| CN | 107779190 A | 3/2018 |
| CN | 107814493 A | 3/2018 |
| DE | 102017118091 A1 | 3/2018 |
| EP | 0725304 B1 | 4/2003 |
| EP | 3118613 A1 | 1/2017 |
| IN | 201617044949 A | 4/2017 |
| IN | 201737006673 A | 5/2017 |
| IN | 201737017732 A | 8/2017 |
| JP | H10-239715 | 9/1998 |
| JP | 2009-529153 | 8/2009 |
| JP | 2011-133622 | 7/2011 |
| JP | 2012-529661 | 11/2012 |
| KR | 2015/007628 | 7/2015 |
| RU | 722219 C | 2/1993 |
| RU | 860456 C | 2/1993 |
| RU | 1334662 C | 2/1993 |
| RU | 972815 C | 10/1993 |
| RU | 2009530 C1 | 3/1994 |
| RU | 2059974 C1 | 5/1996 |
| RU | 2063644 C1 | 7/1996 |
| RU | 2079864 C1 | 5/1997 |
| RU | 2110823 C1 | 5/1998 |
| RU | 2130630 C1 | 5/1999 |
| RU | 2144937 C1 | 1/2000 |
| RU | 2216757 C2 | 11/2003 |
| RU | 2224275 | 2/2004 |
| RU | 2321113 C1 | 3/2008 |
| RU | 2569913 C2 | 12/2015 |
| RU | 2642558 C1 | 1/2018 |
| SI | 0995146 | 6/2003 |
| SU | 566863 | 7/1977 |
| TW | 2015/37274 | 4/2016 |
| WO | WO 2014/134714 A2 | 9/2014 |
| WO | WO 2014/134714 A3 | 9/2014 |
| WO | WO 2014143011 A1 | 9/2014 |
| WO | WO 2015/040029 A2 | 3/2015 |
| WO | WO 2015130227 A1 | 9/2015 |
| WO | WO 2015163824 A1 | 10/2015 |
| WO | WO 2015179564 A1 | 11/2015 |
| WO | WO 2015/183821 A1 | 12/2015 |
| WO | WO 2015/193301 A1 | 12/2015 |
| WO | WO 2016/000996 | 1/2016 |
| WO | WO 2016/028828 | 2/2016 |
| WO | WO 2016081787 A2 | 5/2016 |
| WO | WO 2016/145120 A1 | 9/2016 |
| WO | WO 2016/209323 A1 | 12/2016 |
| WO | WO 2016196546 A1 | 12/2016 |
| WO | WO 2017094218 A1 | 6/2017 |
| WO | WO 2017106852 A1 | 6/2017 |
| WO | WO 2017109265 A1 | 6/2017 |
| WO | WO 2017153403 A1 | 9/2017 |
| WO | WO 2018007355 A1 | 1/2018 |
| WO | WO 2018038743 A1 | 3/2018 |

OTHER PUBLICATIONS

A.L. Gusev, Technical Report (3-D Printer, Electrochrom), Dec. 2012, https://www.researchgate.net/publication/311562920.

Alesanco, et al. "All-in-one gel-based electrochromic devices: Strengths and recent developments", *Materials*, 11, 414, 2018; 27 pages.

Percec et al., "A Single-Layer Approach to Electrochromic Materials", Journal of Polymer Science: Part A: Polymer Chemistry, vol. 49, pp. 361-368, 2010.

International Search Report and Written Opinion for International Application No. PCT/US2015/054337, Notification dated Jan. 13, 2016.

Office Action dated Jul. 2, 2019 in Japanese Patent Application No. 2018-538517; 3 pages.

ELECTROCHROMIC DEVICE AND METHOD FOR MANUFACTURING ELECTROCHROMIC DEVICE

INCORPORATION BY REFERENCE TO ANY PRIORITY APPLICATIONS

This application is a continuation of U.S. patent application Ser. No. 14/300,220, filed Jun. 9, 2014, entitled "ELECTROCHROMIC DEVICE AND METHOD FOR MANUFACTURING ELECTROCHROMIC DEVICE." This application is related to U.S. patent application Ser. No. 14/300,216, filed Jun. 9, 2014, now U.S. Pat. No. 10,294,415, entitled "ELECTROCHROMIC COMPOSITION AND ELECTROCHROMIC DEVICE USING SAME." Each of the above applications is incorporated herein by reference in its entirety.

BACKGROUND OF THE INVENTION

Field of the Invention

The disclosed embodiments relate in general to the field of applied electrochemistry, and in particular to methods for manufacturing electrochromic compositions used in devices with electrically controlled absorption of light such as light filters of variable optical density, light emission modulators, and information image displays.

Description of the Related Art

Electrochromism is the physical phenomenon found in certain compositions of reversibly changing predetermined optical properties such as color or light transmittance with an application of an electrical voltage called a control voltage. Electrochromism provides the basis for operation of various electrochromic devices, such as smart glass well known to persons of ordinary skill in the art. Various types of optical materials and structures can be used to construct the aforesaid compounds with electrochromic properties, with the specific structures being dependent on the specific purpose of the electrochromic device.

Known in the art is a method of manufacturing an electrochromic device (U.S. Pat. No. 4,902,108 issued on Feb. 20, 1990, incorporated herein by reference) wherein an electrically conductive coating of one of two optically transparent electrodes is coated with a thickened solution of polymethylmethacrylate in a low-boiling-point solvent, the solvent then evaporating to yield a layer of polymethylmethacrylate. Following this step, both optically transparent electrodes bond to each other on the perimeter while the electrodes are spaced at a predetermined distance from one another, and the thus-formed space is filled through an opening (openings) in the adhesive with an electrochromic solution that contains cathodic and anodic components; the filled space is then sealed. The layer of polymethylmethacrylate is dissolved, and, as a result, the electrochromic solution thickens, and this significantly reduces the negative effect of gravitational "delamination" of the composition in the electrically colored state. Thus, actually the electrochromic composition is prepared only after completing the assembly of the aforementioned electrochromic device, and this limits the manufacturability of the device as a whole. In addition, the electrochromic composition is a liquid phase having viscosity defined by the amount of polymeric thickener, and the indifferent electrolyte solution introduced into the electrochromic solution provides electroconductivity of the latter if the cathodic and anodic components are not soluble in the ionic state. An indifferent electrolyte is introduced into compositions based on quaternary salts of bipyridine.

Also known in the art is a method for manufacturing an electrochromic device (U.S. Pat. No. 5,471,337 issued on Nov. 28, 1995, incorporated herein by reference) wherein the space between the electrodes is filled with an electrochromic dispersion system comprising the following: a dispersion medium in the form of a solvent that is thickened, preferably, with polymethylmethacrylate or is plasticized with a polymer solvent; a dispersion phase in the form of polyoxometalate as the cathodic component; and an anodic component.

Additionally known are methods for making an electrochromic device by obtaining a solid-like film of an electrochromic composition directly in the device itself by polymerization alone and/or polymerization with crosslinking of monomer chains with the use of initiators of different types (see EP 0612826 A1 of Aug. 31, 1994; WO 97/34186 of Sep. 18, 1997; and WO 98/42796 of Oct. 1, 1998, incorporated herein by reference). However, such polymerization reactions are accompanied by volume shrinkage adversely affecting the quality of the electrochromic device. This negative effect can be particularly manifested in electrochromic devices with large interelectrode spaces (1 to 2 mm) usually provided in electrochromic devices having large work surfaces (more than 0.5 m$^2$).

Therefore, new and improved methods for manufacturing of electrochromic devices are needed that would not be subject to the above deficiencies of the prior art technology.

SUMMARY OF THE INVENTION

The inventive methodology is directed to methods and systems that substantially obviate one or more of the above and other problems associated with conventional methods for manufacturing electrochromic devices.

In accordance with one aspect of the embodiments described herein, there is provided a method for manufacturing an electrochromic device comprising at least two flexible electrodes and a hermetically closed space between the at least two flexible electrodes, at least one of the at least two flexible electrodes being optically transparent, wherein the hermetically closed space between the at least two flexible electrodes is filled with an electrochromic composition, the method comprising: preparing an initial deaerated electrochromic composition in the form of an electrochromic dispersion system containing at least one of a suspension and a colloid, wherein a dispersion medium of the electrochromic dispersion system comprises an electrochromic solution comprising a liquid solvent, a cathodic component, an anodic component, a polymerizable low-shrinkage monomer or a monomer mixture, and a polymerization thermal activator, wherein the dispersion phase consists of a highly dispersible polymer, and wherein the initial electrochromic composition is deaerated to remove the dissolved oxygen of air that were introduced with the highly dispersible polymer; (2) filling the hermetically closed space between the at least two flexible electrodes with the deaerated initial electrochromic composition, and (3) sealing the hermetically closed space between the at least two flexible electrodes.

In accordance with another aspect of the embodiments described herein, there is provided an electrochromic device comprising at least two flexible electrodes and a hermetically closed space between the at least two flexible electrodes, at least one of the at least two flexible electrodes being optically transparent, wherein the hermetically closed space between the at least two flexible electrodes is filled with an electrochromic composition, the electrochromic device being manufactured by a method comprising: (1) preparing an initial deaerated electrochromic composition in the form of an electrochromic dispersion system containing at least one of a suspension and a colloid, wherein a dispersion medium of the electrochromic dispersion system comprises an electrochromic solution comprising a liquid solvent, a cathodic component, an anodic component, a polymerizable low-shrinkage monomer or a monomer mixture, and a polymerization thermal activator, wherein the dispersion phase consists of a highly dispersible polymer, and wherein the initial electrochromic composition is deaerated to remove the dissolved oxygen of air that were introduced with the highly dispersible polymer; (2) filling the hermetically closed space between the at least two flexible electrodes with the deaerated initial electrochromic composition, and (3) sealing the hermetically closed space between the at least two flexible electrodes.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
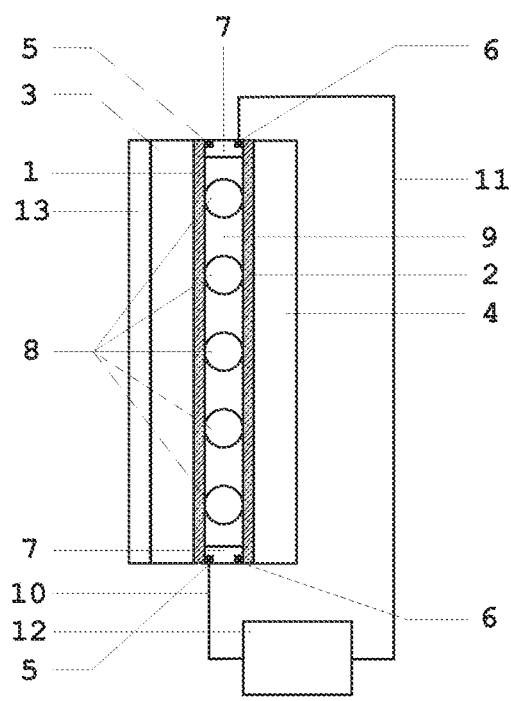
FIG. 1 shows the embodiment of an electrochromic device with two optically transparent electrodes.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there is provided an electrochromic device with an electrochromic composition in the form of a solid polymer layer that has an increased rate of discoloration in a wide temperature range and that imparts stability to the electrochromic device operating under conditions that maintain a long-term colored state and allow for high-voltage control and change of electrode polarity, which result in long-term uniformity of coloration and discoloration, especially for electrochromic devices having large work surface areas.

In accordance with another aspect of the embodiments described herein, there is provided an electrochromic device comprising at least two electrodes, wherein the electrodes are flexible and optically transparent and the interelectrode space is sealed and filled with the prepared electrochromic composition, as described above. The described device achieves long-term stability of a colored state and may operate under conditions that allow for high-voltage control and reversal of electrode polarity, resulting in uniformity of coloration and discoloration. In addition, the described electrochromic device may be manufactured to have a large surface area.

In one or more embodiments, there is provided a method for manufacturing an electrochromic device comprising at least two electrodes that are flexible and optically transparent with a hermetically closed space between the electrodes filled with an electrochromic composition that may contain transparent and insoluble microparticles that function as spacers. In one or more embodiments, the aforesaid method comprises the following steps: preparing an initial electrochromic composition in the form of an electrochromic dispersion system consisting of at least a suspension and/or a colloid, wherein the dispersion medium of said system is an electrochromic solution comprising a liquid solvent, a cathodic component, an anodic component, a polymerizable low-shrinkage monomer, and a polymerization thermal activator. The dispersion phase comprises a highly dispersible polymer. The initial electrochromic composition is deaerated to remove the dissolved oxygen of air that were introduced with the highly dispersible polymer and the hermetically closed space between the at least two flexible electrodes is filled with the initial deaerated electrochromic composition, and the enclosed space between the at least two flexible electrodes is then hermetically sealed.

In one or more embodiments, the method for manufacturing the electrochromic device comprises filling the electrochromic device with an electrochromic composition, which, in general, is an electrochromic dispersion system comprising at least a suspension and/or a colloid, wherein the dispersion medium of the system is an electrochromic solution containing a liquid solvent, a cathodic component, an anodic component, a polymerizable low-shrinkage monomer or monomers, and a polymerization thermal activator. The dispersion phase comprises a highly dispersible polymer. The initial electrochromic composition is deaerated to remove the dissolved oxygen of air that were introduced with the highly dispersible polymer and the hermetically closed space between the at least two flexible electrodes is filled with the initial deaerated electrochromic composition, and the enclosed space between the at least two flexible electrodes is then hermetically sealed.

In one or more embodiments, the aforesaid electrochromic solution may additionally contain an indifferent electrolyte. Provision of an indifferent electrolyte additionally introduced into the dispersion medium accelerates discoloration of the electrically activated electrochromic device and prevents violation of uniformity in coloration and discoloration after operation of the electrochromic device under conditions of long-term polarization with application of DC voltage and/or after application of high voltages.

In one or more embodiments, it is preferable to use the highly dispersed polymer in an amount sufficient to form a solid layer of the electrochromic composition, which is characterized by the lack of volumetric shrinkage during dissolution of the polymer in the above-described electrochromic solution over a wide temperature range.

In one or more embodiments, the low-shrinkage monomer is used in an amount sufficient to provide formation of a solid layer, which is formed after polymerization of the monomer/monomers in the presence of a high dispersible polymer. The monomer/monomers are selected based on their minimal shrinkage during polymerization. The thermal activator of polymerization is used in an amount necessary for the thermal activation of the used monomer or monomers.

In one or more embodiments, the aforesaid liquid solvent is an individual chemical compound or mixture of chemical compounds.

In one or more embodiments, the cathodic component is an individual organic electrochromic compound having at polarograms at least one reversible reduction wave or a mixture of such organic electrochromic compounds. The anodic component is an individual organic electrochromic compound having at polarograms at least one reversible oxidation wave or a mixture of organic electrochromic compounds.

In one or more embodiments, the composition may further comprise transparent insoluble microparticles that function as spacers. These spacers provide a predetermined distance between the transparent, conductive, flexible electrodes.

In one or more embodiments, deaeration of the initial electrochromic composition for removing dissolved oxygen and air introduced with the highly dispersed polymer can be carried out by evacuation.

In one or more embodiments, the described electrochromic device is manufactured by using flexible, optically transparent electrodes that comprise polymeric substrates (particularly, polyethylene terephthalate substrates) coated on one side thereof with a transparent electrically conductive layer of doped indium oxide ($In_2O_3$) or doped tin oxide ($SnO_2$). The electrodes are hermetically bonded around the perimeter so that the conductive coating is located within the closed space defined between the electrodes to prevent contact between the electrodes. The sealing bond may comprise an adhesive joint that usually contains a spacer or spacers to provide a predetermined distance between electrodes. Since the polymeric substrate with the electrodes deposited on it is flexible and does not provide a gap between the surfaces of the conductive layers, the electrochromic composition may be combined with transparent insoluble microparticles that function as additional spacers. These spacers are evenly distributed over the volume occupied by the electrochromic composition. The spacers are comprised of glass or insoluble polymeric microparticles of a predetermined size, wherein the material of the spacers is selected so that it has a refractive index as close as possible to the refractive index of the electrochromic composition. Dimensions of the spacers can range from 20 µm to 200 µm, and determine the volume to be filled with the electrochromic composition.

In one or more embodiments, arranged along the outer perimeter of the adhesive joint or along the longest sides of the electrodes are busbars. The busbars can be located inside the adhesive connection with the withdrawal of conductors outside. One or several holes are left in the adhesive joint for filling the interelectrode space between the source electrodes with the electrochromic composition. After completion of the filling operation, the holes are closed with an inert sealant.

In one or more embodiments, to increase the viscosity of the electrochromic layer and to prevent the phenomenon of gravitational separation, the electrochromic composition can be additionally combined with a highly dispersible polymer. To further increase viscosity [of the composition] after filling the device, the composition can contain some amount of a polymerizable monomer or monomers. Such a monomer (or a monomer mixture) should possess low shrinkage during polymerization. This monomer belongs to the class of monomers polymerizable by a cationic mechanism; an example is a cationic ring-openable polymerization (CROP) monomer. Use of these monomers makes it possible practically to avoid shrinkage during the manufacture of the electrochromic devices. Such an electrochromic layer increases overvoltage of irreversible electrode reactions that are accompanied by gas evolution, which ensures the stability of the electrochromic device against the effects of elevated voltages (more than 2 V).

In one or more embodiments, a space between the electrodes is filled with the initial electrochromic composition through the hole or several holes left in the adhesive joint.

Figure 2:
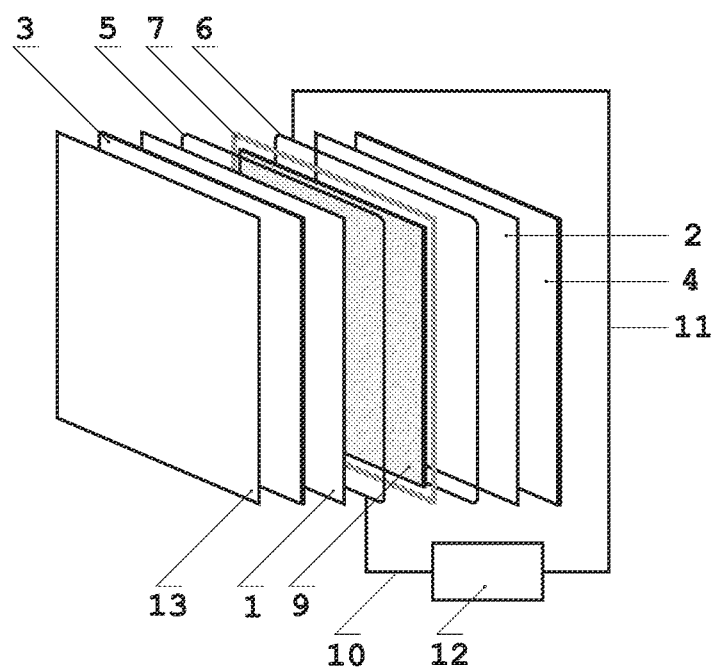
FIG. 2 shows the projection of a set of layers that forms the electrochromic device.

FIG. 1 shows an embodiment of an electrochromic device with two optically transparent electrodes. FIG. 2 shows the projection of an exemplary set of layers that forms the embodiment of the electrochromic device. The illustrated electrochromic device contains two flexible, optically transparent electrodes 1 and 2, which are deposited on substrates 3 and 4, respectively. The substrates 3 and 4 are polymer films, the surface areas of which depend on the specific use of the electrochromic device.

In one or more embodiments, the optically transparent electrodes 1 and 2 are provided with busbars 5 and 6, which are arranged over the entire perimeter on surfaces of the electrodes. The substrates 3 and 4 and their respective electrodes are bonded together along their perimeter by a sealant 7. Sealing may be done either by adhesive bonding or by thermally fusing the polymer substrates 3 and 4. To ensure a predetermined distance between the conductive, optically transparent electrodes 1 and 2, the cavity formed between electrodes is filled with spacers 8. The spacers can be made of glass or insoluble polymer microparticles. The spacers 8 are added to the electrochromic composition in the required amount during composition preparation and are uniformly distributed over the volume of the composition during the stage of device filling. After the device is filled with the electrochromic composition, it is finally sealed. If the polymerizable monomers contained in the electrochromic composition need thermal activation, then the device is heated after sealing. By means of respective wires 10 and 11, the busbars 5 and 6 are connected to a control device 12. When the device is exposed to intensive luminous fluxes, a part of the absorbed energy can be reflected as heat. To prevent the passage of heat radiation (e.g., into the room), the device may be provided with an additional thermally reflective layer 13, which promotes reflection of infrared radiation in the outward direction (e.g., to the street).

Example 1

A first exemplary electrochromic device was manufactured to comprise two flexible, optically transparent $SnO_2$ electrodes with a surface electric resistance of 35 Ohm/$cm^2$ and with a polymeric substrate having a thickness of 200 µm. The size of the electrodes was (5×6) $cm^2$. The electrodes were shifted against one another to provide a current supply and were glued along the perimeter by means of double-sided adhesive tape having a thickness of 100 µm. A hole was left in the adhesive joint having a width of 3 mm for filling the device with the initial electrochromic composition that comprised a dispersion system in the form of a suspension containing the following components: a dispersion medium (electrochromic solution), i.e., a solution of 0.01M 1,1'-dibenzyl-4,4'-bipyridinium diperchlorate and 0.01M 1,1'-diethylferrocene in propylene carbonate; and a dispersion phase (33 mass %), i.e., a copolymer of polymethylmethacrylate and methacrylic acid. Filling of the internal volume of the device by the initial electrochromic composition was performed with heating to a temperature of 70 to 80° C. After completion of the filling operation, the hole in the adhesive seam was sealed.

In this exemplary electrochromic device, the device transmittance in the visible range of the spectrum was 75%. Application to the device of 2 VDC caused uniform and intense coloring into a blue color in the direction from the busbars toward the center. At the wavelength of 610 nm, the time of shading to the minimal transmittance of 8% was 30 sec. When the voltage reached a steady state and short-circuiting of the electrodes, the application of voltage was discontinued, and the device returned to its initial (transparent) state. The time to complete discoloration was 30 sec.

Example 2

A second exemplary electrochromic device was manufactured as the device in Example 1, but prior to filling, the initial electrochromic composition was evacuated for 15 minutes.

In this exemplary electrochromic device, in the visible range of the spectrum, device transmittance was 78%. Application to the device of 2 VDC caused uniform and intense coloring into a blue color. At the wavelength of 610 nm, the time of shading to minimal transmittance of 8% was 25 sec. When the voltage reached a steady state and short-circuiting of the electrodes, the application of voltage was discontinued, and the device returned to its initial (transparent) state. The time to complete discoloration was 20 sec.

Example 3

A third exemplary electrochromic device was manufactured as the device in Example 1, but the initial electrochromic composition contained 3 mass % of glass microspheres having a size of 60 µm. The thickness of the sealing adhesive layer also was equal to 60 µm.

In this exemplary electrochromic device, the device transmittance in the visible range of the spectrum was 70%. Application to the device of 2 VDC caused uniform and intense coloring into a blue color in the direction from the busbars toward the center. At the wavelength of 610 nm, the time of shading to minimal transmittance of 8% was 30 sec. When the voltage reached a steady state and short-circuiting of the electrodes, the application of voltage was discontinued, and the device returned to its initial (transparent) state. The time to complete discoloration was 30 sec.

In this exemplary electrochromic device, on application of compressive mechanical stress perpendicular to the plane of the device, there was no significant change in color uniformity of the device.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in methods for manufacturing electrochromic compositions for use in devices with electrically controlled absorption of light. It is intended that the specification and examples be considered as exemplary only, with a true scope and spirit of the invention being indicated by the following claims.

What is claimed is:

1. A method for manufacturing an electrochromic device, the method comprising:
    providing at least two substrates having a space therebetween;
    preparing a dispersion phase comprising a polymer;
    preparing a dispersion medium comprising a liquid solvent, a cathodic component, an anodic component, a polymerizable mixture, and a polymerization thermal activator;
    combining the dispersion phase and the dispersion medium to form an electrochromic composition comprising a colloidal dispersion in which the polymer is dispersed in the dispersion medium;
    filling the space with the electrochromic composition; and
    after combining the dispersion phase and the dispersion medium and after filling the space, polymerizing the polymerizable mixture in the colloidal dispersion in the presence of the polymer dispersed in the dispersion medium.

2. The method of claim 1, wherein the amount of the polymerizable mixture is such that a solid layer is formed after polymerizing the polymerizable mixture in the presence of the polymer.

3. The method of claim 1, wherein the amount of the polymerization thermal activator is sufficient to thermally activate polymerization of the polymerizable mixture.

4. The method of claim 1, wherein the at least two substrates comprise polymeric substrates.

5. The method of claim 4, wherein the polymeric substrates are coated on one side thereof with a transparent electrically conductive layer of doped indium oxide (In2O3) or doped tin oxide (SnO2).

6. The method of claim 4, wherein the polymeric substrates are polyethylene terephthalate substrates.

7. The method of claim 1, wherein polymerizing comprises heating to thermally activate the polymerization of the polymerizable mixture.

8. The method of claim 1, further comprising hermetically sealing the space after filling.

9. The method of claim 1, wherein polymerizing comprises heating the polymerizable mixture to thermally activate the polymerization of the polymerizable mixture.

10. The method of claim 9, wherein heating is performed after hermetically sealing.

11. The method of claim 1, wherein the dispersion medium comprises 1,1'-dibenzyl-4,4'-bipyridinium diperchlorate and 1,1'-diethylferrocene in propylene carbonate.

12. The method of claim 1, wherein the polymer is a copolymer of polymethylmethacrylate and methacrylic acid.

* * * * *